United States Patent
Hayashi et al.

(10) Patent No.: US 10,545,033 B2
(45) Date of Patent: Jan. 28, 2020

(54) MULTI-TURN DETECTOR

(71) Applicant: OKUMA Corporation, Niwa-gun, Aichi (JP)

(72) Inventors: Yasukazu Hayashi, Aichi (JP); Koji Kitagawa, Aichi (JP); Yasunori Kawakami, Aichi (JP); Hiroaki Matsuura, Aichi (JP)

(73) Assignee: OKUMA CORPORATION, Aichi (JP)

( * ) Notice: Subject to any disclaimer, the term of this patent is extended or adjusted under 35 U.S.C. 154(b) by 63 days.

(21) Appl. No.: 15/159,120

(22) Filed: May 19, 2016

(65) Prior Publication Data
US 2016/0341574 A1   Nov. 24, 2016

(30) Foreign Application Priority Data

May 21, 2015 (JP) ................. 2015-103821

(51) Int. Cl.
*G01D 5/20* (2006.01)
*G01D 5/04* (2006.01)

(52) U.S. Cl.
CPC .................... *G01D 5/204* (2013.01)

(58) Field of Classification Search
CPC ................... G01D 5/204; G01D 5/04
See application file for complete search history.

(56) References Cited

U.S. PATENT DOCUMENTS

| 4,174,484 | A | * | 11/1979 | Schmider | ............... G01P 3/481 310/268 |
| 4,893,077 | A | * | 1/1990 | Auchterlonie | ........... G01B 7/14 318/656 |
| 5,357,197 | A | | 10/1994 | Sorkin | |
| 5,815,081 | A | | 9/1998 | Dames et al. | |

(Continued)

FOREIGN PATENT DOCUMENTS

| JP | 02012014 A | 1/1990 |
| JP | H10500481 A | 1/1998 |

(Continued)

OTHER PUBLICATIONS

JPO Notice of Grounds for Rejection corresponding to JP Application No. 2015-103821; dated Nov. 6, 2018.

(Continued)

*Primary Examiner* — Akm Zakaria
(74) *Attorney, Agent, or Firm* — Cantor Colburn LLP (57) ABSTRACT

A multi-turn detector is configured to detect an amount of multiple turns of an input shaft using a plurality of resolvers. Each resolver includes a rotor portion and a stator portion. The rotor portion has a rotor core composed of a magnetic flux modulating component. The rotor portion rotates in accordance with rotation of the input shaft at a reduction gear ratio that is different from that of a rotor portion of another resolver. The stator portion has an excitation winding that excites an ac magnetic flux in a direction of an axis of rotation of the rotor portion and two detection windings that output ac signals that are obtained by performing (Continued)

amplitude modulation in accordance with a rotation angle of the rotor portion. The excitation windings and the detection windings of the plurality of resolvers are formed by conductor traces in a common multi-layer printed circuit board.

12 Claims, 3 Drawing Sheets

(56) References Cited

U.S. PATENT DOCUMENTS

| | | | |
|---|---|---|---|
| 6,522,128 B1* | 2/2003 | Ely | G01B 7/30 324/207.17 |
| 6,534,970 B1 | 3/2003 | Ely et al. | |
| 7,191,754 B2* | 3/2007 | Keefover | F02D 9/1065 123/337 |
| 7,579,829 B1 | 8/2009 | Wong et al. | |
| 2003/0112157 A1 | 6/2003 | Strasser | |
| 2004/0222787 A1 | 11/2004 | Tiemann | |
| 2004/0232632 A1* | 11/2004 | Beck | B60G 17/016 280/5.5 |
| 2006/0208726 A1* | 9/2006 | Mock | G01D 5/2452 324/207.24 |
| 2006/0250128 A1* | 11/2006 | Tahara | G01D 5/2086 324/207.25 |
| 2007/0000455 A1* | 1/2007 | Akiyama | F02D 11/106 123/19 |
| 2008/0238226 A1* | 10/2008 | Miyamoto | H02K 3/47 310/71 |
| 2009/0179632 A1* | 7/2009 | Nishiguchi | G01D 5/2046 324/207.25 |
| 2011/0156699 A1 | 6/2011 | Shibata et al. | |
| 2011/0207578 A1* | 8/2011 | Lee | G01D 5/04 477/34 |
| 2014/0117980 A1* | 5/2014 | Ely | G01D 5/2046 324/207.17 |
| 2015/0323349 A1* | 11/2015 | Has | G01D 5/04 324/207.15 |

FOREIGN PATENT DOCUMENTS

| | | |
|---|---|---|
| JP | 3024972 B1 | 3/2000 |
| JP | 2000292120 A | 10/2000 |
| JP | 2004101423 A | 4/2004 |
| JP | 2004515758 A | 5/2004 |
| JP | 2004333478 A | 11/2004 |
| JP | 2006042471 A | 2/2006 |
| JP | 2010044055 A | 2/2010 |
| JP | 2011135682 A | 7/2011 |

OTHER PUBLICATIONS

CN First Office Action corresponding to Application No. 2016103369248; dated Jan. 30, 2019.

* cited by examiner

MULTI-TURN DETECTOR

CROSS REFERENCE TO RELATED APPLICATION

The entire disclosure of Japanese Patent Application No. 2015-103821 filed on May 21, 2015 including specification, claims, drawings, and abstract, is incorporated herein by reference in its entirety.

TECHNICAL FIELD

The present invention relates to a multi-turn detector that is incorporated in a servomotor for, for example, a machine tool or a robot and that detects an amount of multiple turns of a motor shaft.

BACKGROUND

Such multi-turn detectors have been disclosed. For example, JP H2-12014 A discloses an absolute position detector, JP 2011-135682 A discloses a multi-turn detector, and JP 2004-515758 A discloses a multi-turn code shaft encoder.

SUMMARY

Technical Problem

Although the technique disclosed in JP H2-12014 A has a merit in that the outer diameter size can be smaller as a plurality of resolvers are disposed on the same axis, this technique has drawbacks in that it requires steps for individually winding wire into excitation coils for individual resolvers and in that the length in the axial direction is longer. Although the technique disclosed in JP 2011-135682 A has merits in that the length in the axial direction can be shorter as a plurality of resolvers are disposed on the same plane and in that the winding for a plurality of resolvers can be performed in one process, because this technique employs a structure wherein a plurality of resolvers are disposed on the same plane and employs a method wherein the resolvers use a radial magnetic path for which turns of wire are disposed outside the rotor core, the outer diameter tends to be larger due to the space for the turns of wire and the magnetic path in the perimeter. Additionally, because a heavy magnetic material such as a silicon steel plate is disposed in the perimeter, there have been drawbacks in that the weight and the inertia are greater. The technique disclosed in JP 2004-515758 A does not require steps for winding wire into coils because a plurality of rotary shafts have magnets disposed thereon and a coded axial magnetic flux is detected by magnetic field detection sensor elements disposed on a printed circuit board. In this technique, the length in the axial direction can be shorter than that in JP H2-12014 A, and the outer diameter size can be smaller than that in JP 2011-135682 A. However, because the technique disclosed in JP 2004-515758 A uses the magnetic field detection sensor elements and the magnets, there has been a drawback in that component costs are higher than those for a structure composed of a magnetic material such as a silicon steel plate and coils of wires as disclosed in JP H2-12014 A or JP 2011-135682 A. Also, in the technique disclosed in JP 2004-515758 A, the length in the axial direction tends to be longer than that in JP 2011-135682 A due to the thickness of the magnets and the magnetic field detection sensor elements.

Under such circumstances, the present invention is directed toward providing a multi-turn detector for which steps for winding wire into coils are unnecessary, the length in the axial direction is short, the outer diameter size is small, and costs are low.

Solution to Problem

According to one aspect of the present invention, there is provided a multi-turn detector for detecting an amount of multiple turns of an input shaft using a plurality of resolvers, each resolver comprising a rotor portion having a rotor core composed of a magnetic flux modulating component, the rotor portion rotating in accordance with rotation of the input shaft at a reduction gear ratio that is different from that of a rotor portion of another resolver; and a stator portion having an excitation winding that excites an ac magnetic flux in a direction of an axis of rotation of the rotor portion and two detection windings that output ac signals that are obtained by performing amplitude modulation in accordance with a rotation angle of the rotor portion, wherein the excitation windings and the detection windings of the plurality of resolvers are formed by conductor traces in a common multi-layer printed circuit board.

In one embodiment, the excitation winding is a conductor trace that is wound about a center of rotation of the rotor portion, and the detection windings are conductor traces that extend on circumferences of two circles that have different centers and radii of the same length, the conductor traces having a shape that is folded back in reverse directions at or near one of points of intersection of the two circles to extend in a first direction on a circumference of one of the two circles and to extend in a second direction opposite the first direction on a circumference of the other circle.

In one embodiment, the stator portion further has an annular conductor trace that is shaped into a circle that has its center at the center of rotation of the rotor portion, the annular conductor trace enclosing the two detection windings, and the annular conductor trace is disposed in the common multi-layer printed circuit board.

In one embodiment, the two detection windings include a first detection winding for outputting an ac signal that is obtained by performing amplitude modulation on a sinusoidal value of a rotation angle of a corresponding rotor portion and a second detection winding for outputting an ac signal that is obtained by performing amplitude modulation on a cosine value of a rotation angle of a corresponding rotor portion, and a detection winding of each of the plurality of resolvers is serially connected to a detection winding of another resolver through wiring composed of one or more conductor traces in the multi-layer printed circuit board. In one embodiment, the wiring includes two conductor traces that are identical in shape and are disposed at the same position in two different layers, the two conductor traces being connected to an associated detection winding at a portion of the associated detection winding within a range of plus or minus 30 degrees from a position of the associated detection winding that is farthest from the center of rotation of the rotor portion.

In one embodiment, ends of the excitation windings of the plurality of resolvers are connected to a common conductor solid pattern provided in the multi-layer printed circuit board.

In one embodiment, the rotor portion includes a resin gear and the magnetic flux modulating component that is bonded to the resin gear. In one embodiment, the magnetic flux modulating component of the rotor portion is a steel plate.

In one embodiment, the magnetic flux modulating component of the rotor portion is composed of a non-magnetic metal.

In one embodiment, a soft magnetic material plate is disposed on a side opposite the rotor portions with the multi-layer printed circuit board interposed between the soft magnetic material plate and the rotor portions. In one embodiment, the soft magnetic material plate is a steel plate and is bonded, by sheet metal working, to stationary shafts that support the rotation of the rotor portions. In one embodiment, the soft magnetic material plate is of a size covering all of the detection windings.

Advantageous Effects of Invention

According to an embodiment of the present invention, windings for a plurality of resolvers can be formed by a single multi-layer printed circuit board. Therefore, steps for winding wire into coils are unnecessary. A resolver has a detection winding that is disposed inside a rotor portion and that does not use a magnetic path located in the perimeter of the rotor portion. With this structure, the diameter of the resolver can be smaller, and the outer diameter of the multi-turn detector can be smaller. This structure also makes it easy to reduce the weight and the inertia. Because a resolver can be formed by, for example, a thin-thickness printed circuit board and a steel plate, the thickness in the axial direction can be smaller. Because materials for these components are mass-produced, it is also easy to reduce the costs.

BRIEF DESCRIPTION OF DRAWINGS

Embodiments of the present disclosure will be described by reference to the following figures, wherein.

DESCRIPTION OF EMBODIMENTS

Figure 1:
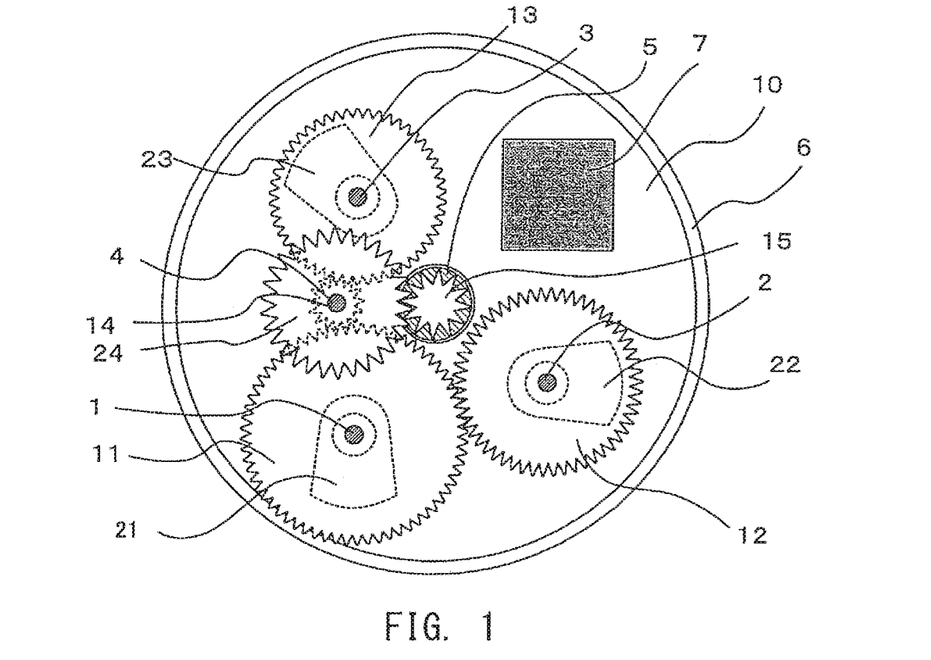
FIG. 1 is a plan view illustrating an example of a multi-turn detector according to an embodiment of the present invention.
Figure 2:
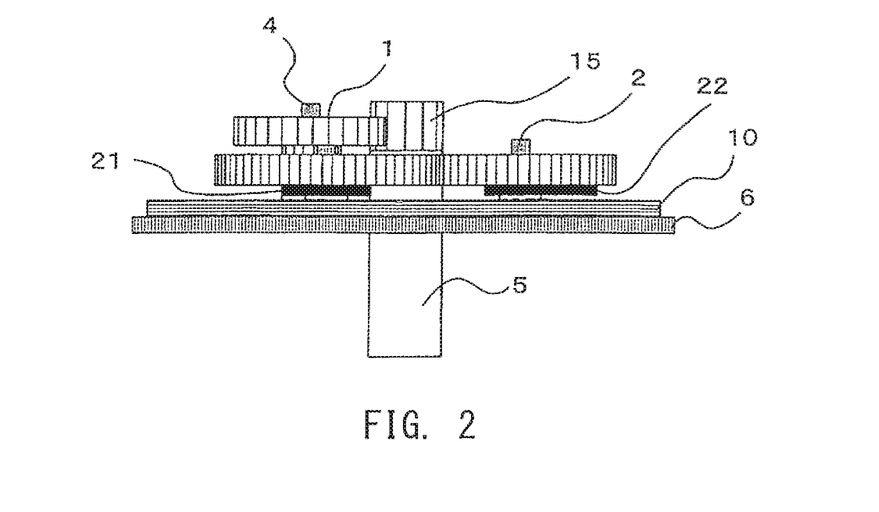
FIG. 2 is a side view of the multi-turn detector illustrated in FIG. 1.

Embodiments of the present invention will be described below. FIG. 1 is a plan view illustrating an example of a multi-turn detector according to an embodiment of the present invention. FIG. 2 is a side view of the multi-turn detector illustrated in FIG. 1. The multi-turn detector includes a plate 6 serving as a base component for the whole structure, a plurality of (three in the illustrated embodiment) resolvers, and a microprocessor 7 electrically connected to the plurality of resolvers. Each of the resolvers includes a rotor portion that rotates in accordance with rotation of an input shaft 5 and a stator portion that includes conductor traces formed in a four-layer printed circuit board 10, which will be described in detail below.

The plate 6 is shaped in a disk having a hole at a center portion to receive the input shaft 5. The plate 6 is manufactured by stamping a plate composed of, for example, a soft magnetic material such as martensite stainless steel. The four-layer printed circuit board 10 is bonded and fixed to the plate 6 using an adhesive sheet. Stationary shafts 1, 2, 3, and 4 made of martensite stainless steel are press-fitted and fixed to the plate 6. The input shaft 5 is supported rotatably about an axis with respect to the plate 6 via a ball bearing and other structural components, which are not illustrated in the figures. A gear 15 is formed in an upper end portion of the input shaft 5 by hobbing.

The gear 15 is in engagement with a resin gear 24 that is fixedly attached to the stationary shaft 4. Additionally, a resin gear 14 is also fixedly attached to the stationary shaft 4. The stationary shaft 4, the resin gear 14, and the resin gear 24 are joined together and may be integrally molded by, for example, injection molding. The resin gear 14 is in engagement with a resin gear 11 that is attached to the stationary shaft 1, and is in engagement with a resin gear 13 that is attached to the stationary shaft 3. The resin gear 11 is also in engagement with a resin gear 12 that is attached to the stationary shaft 2. With such a reduction gear mechanism, 32/3 rotation of the input shaft 5 causes one complete rotation of the resin gear 11, 27/3 rotation of the input shaft 5 causes one complete rotation of the resin gear 12 in the reverse direction, and 25/3 rotation of the input shaft 5 causes one complete rotation of the resin gear 13.

A rotor core 21 manufactured by stamping a martensite stainless steel plate is bonded and fixed to the resin gear 11. The resin gear 11 and the rotor core 21 form a rotor portion of a resolver in which both the resin gear 11 and the rotor core 21 rotate about the center of the stationary shaft 1. Similarly, rotor cores 22 and 23 are respectively bonded and fixed to the resin gears 12 and 13. The resin gear 12 and the rotor core 22 form a rotor portion of a resolver, and the resin gear 13 and the rotor core 23 form a rotor portion of another resolver. The rotor portions of these two resolvers rotate about the centers of the stationary shafts 2 and 3 that are different from each other. All of the three rotor cores 21, 22, and 23 are of identical shape, and in the illustrated embodiment, are bell-shaped as illustrated in FIG. 1.

Figure 3:
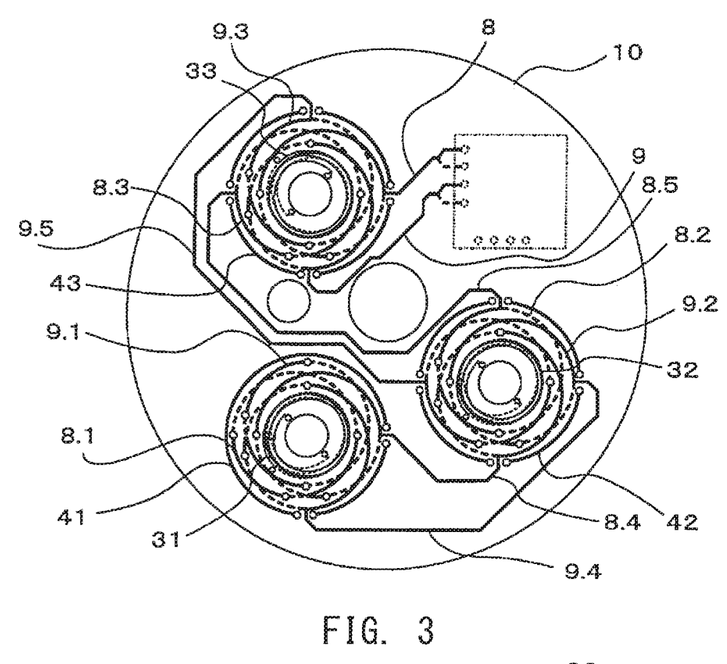
FIG. 3 is a pattern diagram of a four-layer printed circuit board illustrated in FIG. 1, in which a first-layer conductor pattern is illustrated by solid lines, and a second-layer conductor pattern is illustrated by broken lines.
Figure 4:
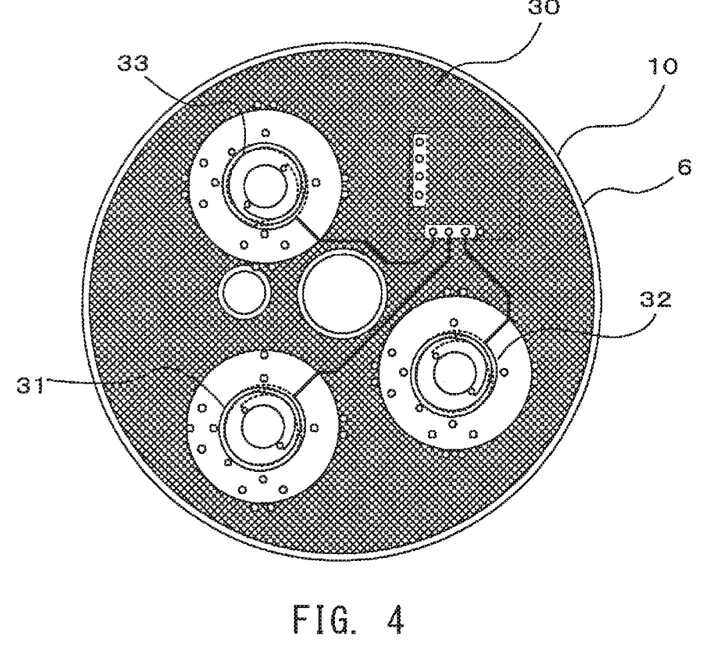
FIG. 4 is a pattern diagram of the four-layer printed circuit board illustrated in FIG. 1, in which a third-layer conductor pattern is illustrated by solid lines, and a fourth-layer conductor pattern is hatched.

The four-layer printed circuit board 10 is disposed between the plate 6 and the rotor portions. A plurality of conductor traces are formed in the printed circuit board 10, and these conductor traces form stator portions of the three resolvers. FIGS. 3 and 4 are pattern diagrams illustrating conductor patterns in the printed circuit board 10 provided for the multi-turn detector. Referring to FIG. 3, a first-layer conductor pattern of the four-layer printed circuit board 10 is illustrated by solid lines, and a second-layer conductor pattern of the four-layer printed circuit board 10 is illustrated by broken lines. Referring to FIG. 4, a third-layer conductor pattern of the four-layer printed circuit board 10 is illustrated by solid lines, and a fourth-layer conductor pattern of the four-layer printed circuit board 10 is hatched.

Holes are formed in the four-layer printed circuit board 10 at positions corresponding to the input shaft 5 and the stationary shafts 1, 2, 3, and 4, to receive portions of the shafts and the resin gears. The plurality of conductor traces that form the stator portions of the resolvers are formed around the stationary shafts 1, 2, and 3. The stator portions of the resolvers include excitation windings 31, 32, and 33, detection windings 8.1, 9.1, 8.2, 9.2, 8.3, and 9.3, and annular conductor traces 41, 42, and 43.

More specifically, the excitation winding 31 having a circular shape is formed around the stationary shaft 1 by four layers of conductor traces and vias. Similarly, the excitation winding 32 is formed around the stationary shaft 2 and the excitation winding 33 is formed around the stationary shaft 3 by four layers of conductor traces and vias. The excitation winding 31 has a configuration in which turns of winding formed in the four layers are connected through the vias. The excitation winding 31 includes 2.25 turns of winding in each layer, and includes, in total, 9 turns of winding in the four layers. Similar to the excitation winding 31, each of the excitation windings 32 and 33 includes, in total, 9 turns of winding that are composed of turns of winding in the four layers, each layer including 2.25 turns of winding that are connected through the vias.

The two detection windings 8.1 and 9.1 are formed in a portion outside of the excitation winding 31. Similarly, the detection windings 8.2 and 9.2 are formed in a portion outside of the excitation winding 32, and the detection windings 8.3 and 9.3 are formed in a portion outside of the excitation winding 33. Each of these detection windings 8.1, 9.1, 8.2, 9.2, 8.3, and 9.3 includes a conductor pattern formed in the first layer of the printed circuit board 10 and a conductor pattern formed in the second layer of the printed circuit board 10.

Figure 5:
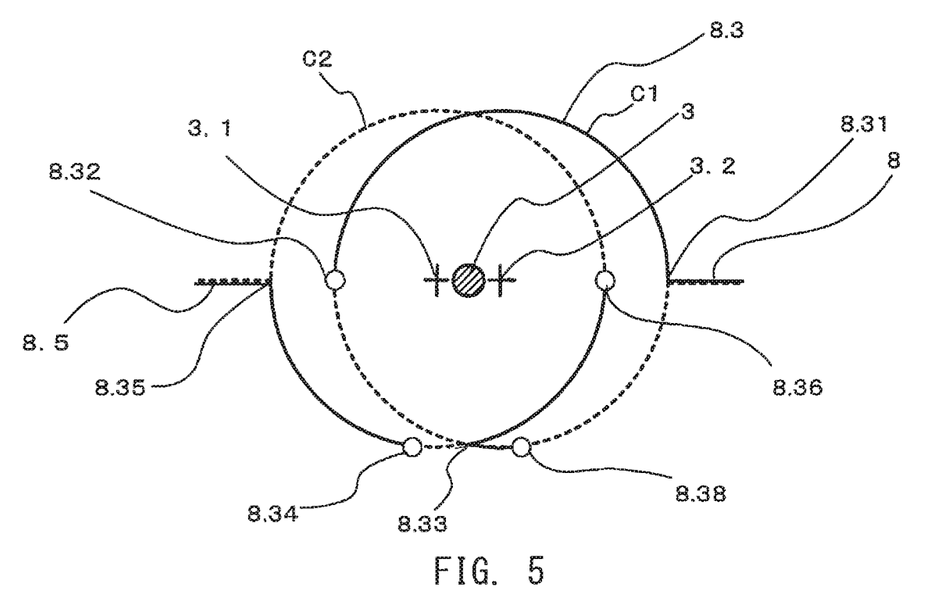
FIG. 5 is an enlarged view of a detection winding 8.3 illustrated in FIG. 3.

FIG. 5 is an enlarged view of the detection winding 8.3. As illustrated in the enlarged view of FIG. 5, the detection winding 8.3 is formed by first-layer conductor traces (illustrated by solid lines), second-layer conductor traces (illustrated by broken lines), and vias (illustrated by open circles) that connect the first-layer and second-layer conductor traces. The detection winding 8.3 extends along circumferences of two circles C1 and C2 that have different centers and radii of the same length, the centers of the two circles C1 and C2 being shifted from each other in a lateral direction with the stationary shaft 3 located between them. More specifically, the circles C1 and C2 have radii of the same length and have centers at points 3.2 and 3.1 that are located symmetrically apart by 180 degrees with the stationary shaft 3 located between them. The detection winding 8.3 extends from a position 8.31 on the circle C1 in a counterclockwise direction to go through a via 8.32 on the circle C1 to an intersection point position 8.33 at which the circles C1 and C2 intersect each other, and then, goes back in a reverse direction to extend from the intersection point position 8.33 in a clockwise direction to go through a via 8.34 on the circle C2, a position 8.35 on the circle C2, and a via 8.36 on the circle C2 to the intersection point position 8.33 at which the circles C1 and C2 intersect each other, and then, again goes back in a reverse direction to extend from the intersection point position 8.33 in a counterclockwise direction to go through a via 8.38 on the circle C1 to the position 8.31 on the circle C1. In other words, the detection winding 8.3 includes a conductor pattern of a shape that is folded back in reverse directions at one of points of intersection of two circles that have different centers and radii of the same length to extend in a first direction on a circumference of one of the two circles and to extend in a second direction opposite the first direction on a circumference of the other circle.

In this example, as illustrated in FIG. 5, the positions 8.31 and 8.35 are located farthest from the stationary shaft 3. As illustrated in FIG. 5, at the positions 8.31 and 8.35, the detection winding 8.3 disappears and starts afresh in another layer. More specifically, an end of a first-layer conductor trace and an end of a second-layer conductor trace are located at the position 8.35, and the two ends are not connected through a via. Similarly, an end of a first-layer conductor trace and an end of a second-layer conductor trace are located at the position 8.31, and the two ends are not connected through a via.

The detection winding 8.3 is connected to the microprocessor 7 through a conductor trace pair 8 and is connected to the detection winding 8.2 of another resolver through a conductor trace pair 8.5. The conductor trace pair 8 includes a first conductor trace formed in the first layer and a second conductor trace formed in the second layer to be located at the same position as that of the first conductor trace and to have the same shape as that of the first conductor trace. Similarly, the conductor trace pair 8.5 includes a first conductor trace and a second conductor trace that are formed in the first layer and in the second layer to be located at the same position as each other and to have the same shape as each other. One end of the conductor trace pair 8 is connected to the detection winding 8.3 at the position 8.31 that is farthest from the stationary shaft 3, and one end of the conductor trace pair 8.5 is connected to the detection winding 8.3 at the position 8.35 that is farthest from the stationary shaft 3.

The detection windings 8.1 and 9.2 have a configuration similar to that of the detection winding 8.3. Specifically, the detection winding 8.1 is formed by first-layer conductor traces, second-layer conductor traces, and vias that connect the first-layer and second-layer conductor traces. The detection winding 8.1 includes a conductor pattern of a shape that is folded back in reverse directions at one of points of intersection of two circles that have different centers and radii of the same length, the centers of the two circles being shifted from each other in a lateral direction with the stationary shaft 1 located between them, to extend in a first direction on a circumference of one of the two circles and to extend in a second direction opposite the first direction on a circumference of the other circle. The detection winding 9.2 is formed by first-layer conductor traces, second-layer conductor traces, and vias that connect the first-layer and second-layer conductor traces. The detection winding 9.2 includes a conductor pattern of a shape that is folded back in reverse directions at one of points of intersection of two circles that have different centers and radii of the same length, the centers of the two circles being shifted from each other in a lateral direction with the stationary shaft 2 located between them, to extend in a first direction on a circumference of one of the two circles and to extend in a second direction opposite the first direction on a circumference of the other circle.

The detection winding 9.3 has a configuration similar to that of the detection winding 8.3 in which it is rotated about a corresponding shaft (the stationary shaft 3) by 90 degrees. Similarly, the detection winding 9.1 has a configuration similar to that of the detection winding 8.1 in which it is rotated about a corresponding shaft by 90 degrees, and the detection winding 8.2 has a configuration similar to that of the detection winding 9.2 in which it is rotated about a corresponding shaft by 90 degrees. As can be understood from the foregoing description, in the illustrated embodiment, the excitation windings and the detection windings of the three resolvers having a shaft angle multiplier of 1× that rotate about the stationary shafts 1, 2, and 3 are disposed in the same multi-layer printed circuit board.

The detection winding 8.1 and the detection winding 8.2 are connected through a conductor trace pair 8.4. One end of the conductor trace pair 8.4 is connected to a portion of the detection winding 8.1 that is farthest from the stationary shaft 1 toward the right side in the lateral direction, and another end of the conductor trace pair 8.4 is connected to a portion of the detection winding 8.2 that is farthest from the stationary shaft 2 toward the lower side in the vertical direction. The detection winding 8.2 and the detection winding 8.3 are connected through the conductor trace pair 8.5. One end of the conductor trace pair 8.5 is connected to a portion of the detection winding 8.2 that is farthest from the stationary shaft 2 toward the upper side in the vertical direction, and another end of the conductor trace pair 8.5 is connected to a portion of the detection winding 8.3 that is farthest from the stationary shaft 3 toward the left side in the lateral direction. The detection winding 8.3 is connected to the microprocessor 7 through the conductor trace pair 8. One end of the conductor trace pair 8 is connected to a portion of the detection winding 8.3 that is farthest from the stationary shaft 3 toward the right side in the lateral direction.

The detection winding 9.1 and the detection winding 9.2 are connected through a conductor trace pair 9.4. One end of the conductor trace pair 9.4 is connected to a portion of the detection winding 9.1 that is farthest from the stationary shaft 1 toward the lower side in the vertical direction, and another end of the conductor trace pair 9.4 is connected to a portion of the detection winding 9.2 that is farthest from the stationary shaft 2 toward the right side in the lateral direction. The detection winding 9.2 and the detection winding 9.3 are connected through a conductor trace pair 9.5. One end of the conductor trace pair 9.5 is connected to a portion of the detection winding 9.2 that is farthest from the stationary shaft 2 toward the left side in the lateral direction, and another end of the conductor trace pair 9.5 is connected to a portion of the detection winding 9.3 that is farthest from the stationary shaft 3 toward the upper side in the vertical direction. The detection winding 9.3 is connected to the microprocessor 7 through a conductor trace pair 9. One end of the conductor trace pair 9 is connected to a portion of the detection winding 9.3 that is farthest from the stationary shaft 3 toward the lower side in the vertical direction.

As described above, in the illustrated embodiment, detection windings are connected to each other through a pair of conductor traces that are disposed in two adjacent layers of the multi-layer printed circuit board, the pair of conductor traces being identical in shape and being located at the same position as each other. As a result, the area sandwiched between the two conductor traces can be reduced, and the influence of, for example, an excitation magnetic flux linking the two conductor traces can be minimized. In the illustrated embodiment, the location of an external wiring connection of a detection winding (the location of a connection between a detection winding and a conductor trace pair) is located away from the center of rotation of a rotor portion. This configuration has the same effect as that of a configuration in which the location of an external wiring connection of a detection winding is located away from an excitation winding, which can reduce the level of a harmful induced voltage that is induced by an excitation magnetic flux at wired locations other than the detection windings. The location of an external wiring connection of a detection winding may be at a position on the detection winding within a range of plus or minus about 30 degrees from a position of the detection winding that is farthest from the center of rotation of a corresponding rotor portion. This configuration avoids the necessity for additional via connection for wiring, and can also reduce the influence of an excitation magnetic flux on the wiring.

Further, the multi-layer printed circuit board also has the annular conductor traces 41, 42, and 43. The annular conductor traces 41, 42, and 43 are disposed on circumferences that have their centers at the stationary shafts 1, 2, and 3 and that are of a size enclosing a corresponding detection winding. The annular conductor trace 41 is connected to a fourth-layer solid pattern 30 through four vias, and each of the annular conductor traces 42 and 43 is connected to the fourth-layer solid pattern 30 through eight vias. In this configuration, if a magnetic flux generated from the excitation winding 31, 32, or 33 leaks to the outside of the annular conductor trace 41, 42, or 43, a current that attempts to cancel the leakage magnetic flux flows through the annular conductor trace 41, 42, or 43. As a result, a magnetic flux generated from the excitation winding 31, 32, or 33 can be prevented from leaking to the outside of the detection winding. The fourth-layer GND solid pattern 30 is a solid conductor pattern that has holes corresponding to circles that have their centers at the stationary shafts 1, 2, and 3 and that are of a size enclosing a corresponding detection winding. Under a similar mechanism, the fourth-layer GND solid pattern also prevents a magnetic flux generated from the excitation winding 31, 32, or 33 from leaking to the outside of the detection winding. As a result, because signal interference between the three resolvers that rotate about the stationary shafts 1, 2, and 3 can be reduced, the distance between the resolvers can be smaller.

The excitation windings 31, 32, and 33 are individually connected to different output pins of the microprocessor 7 through wiring composed of conductor traces formed in the third layer. The excitation windings 31, 32, and 33 are also individually connected to the fourth-layer GND solid pattern through fourth-layer conductor traces that form the same shape as that of the wiring in the third layer and that are located at the same position as that of the wiring in the third layer. As a result, the GND solid pattern is present in the fourth layer covering an entire area that is directly below the wiring disposed in the third layer that connects the excitation windings 31, 32, and 33 to the microprocessor 7. This configuration can minimize the level of a harmful excitation magnetic flux generated from the wiring for the excitation windings 31, 32, and 33.

The microprocessor 7 incorporates excitation circuits for three excitation windings and an amplifier and an AD converter for signals from two detection windings. The three excitation circuits in the microprocessor 7 individually excite the excitation windings 31, 32, and 33 in a time division manner using an alternating current (ac) pulse signal. The time division pulse excitation of the excitation windings 31, 32, and 33 causes magnetic fluxes generated from the excitation windings 31, 32, and 33 between the soft magnetic material plate 6 and the soft magnetic material rotor cores 21, 22, and 23 that oppose the soft magnetic material plate 6 to pass near the stationary shafts 1, 2, and 3 in the axial direction to pass through the rotor cores to form loops that link the detection windings in the axial direction and that pass through the plate 6. Magnetic flux linkages corresponding to areas that generally overlap the rotor cores pass through the detection windings. As a result, induced voltages that are obtained by performing amplitude modulation on cosine values of rotation angles $\theta1$, $-\theta2$, and $\theta3$ of the rotor cores 21, 22, and 23 are generated in the detection windings 8.1, 9.2, and 8.3. Similarly, induced voltages that are obtained by performing amplitude modulation on sinusoidal values of the rotation angles $\theta1$, $-\theta2$, and $\theta3$ of the rotor cores 21, 22, and 23 are generated in the detection windings 9.1, 8.2, and 9.3. In other words, the detection windings 9.1, 8.2, and 9.3 are first detection windings for outputting ac signals that are obtained by performing amplitude modulation on a sinusoidal value of the rotation angle of a corresponding rotor portion, and the detection windings 8.1, 9.2, and 8.3 are second detection windings for outputting ac signals that are obtained by performing amplitude modulation on a cosine value of the rotation angle of a corresponding rotor portion. As described above, the detection windings 8.1, 8.2, and 8.3 are serially connected, and the detection windings 9.1, 9.2, and 9.3 are serially connected, to which a corresponding one of the pairs of wiring 8 and 9 is connected. As such, the microprocessor 7 amplifies and AD-converts induced voltages that are individually generated in the wiring 8 and 9 as the pulse excitation occurs, which enables detection of values that are proportional to cosine values and sinusoidal values of the rotation angles θ1, −θ2, and θ3 of the rotor cores 21, 22, and 23 and the resin gears 11, 12, and 13.

In the illustrated embodiment, the second detection windings 8.1 and 8.3 for the stationary shafts 1 and 3 are serially connected to the first detection winding 8.2 for the stationary shaft 2, and the first detection windings 9.1 and 9.3 for the stationary shafts 1 and 3 are serially connected to the second detection winding 9.2 for the stationary shaft 2. The detection windings are connected in series in these combinations because the stationary shaft 2 rotates in the reverse direction to the direction in which the stationary shafts 1 and 3 rotate. If the stationary shaft 2 is disposed to rotate in the same direction as the direction in which the stationary shafts 1 and 3 rotate, the first detection windings 9.1 and 9.3 for the stationary shafts 1 and 3 may be serially connected to the first detection winding 8.2 for the stationary shaft 2, and the second detection windings 8.1 and 8.3 for the stationary shafts 1 and 3 may be serially connected to the second detection winding 9.2 for the stationary shaft 2. In other words, a first detection winding of one resolver may be serially connected to a first detection winding of another resolver that rotates in the same direction as the direction in which the first resolver rotates and to a second detection winding of another resolver that rotates in the reverse direction to the direction in which the first resolver rotates. Similarly, a second detection winding of one resolver may be serially connected to a second detection winding of another resolver that rotates in the same direction as the direction in which the first resolver rotates and to a first detection winding of another resolver that rotates in the reverse direction to the direction in which the first resolver rotates.

Arctangent calculation of values that are proportional to cosine values and sinusoidal values of the rotation angles θ1, −θ2, and θ3 of the resin gears 11, 12, and 13 in the microprocessor 7 enables detection of the rotation angles θ1, −θ2, and θ3 of the resin gears 11, 12, and 13. Further, because one complete turn of θ1, −θ2, and θ3 respectively corresponds to 32/3 turns, 27/3 turns, and 25/3 turns of the input shaft 5, arithmetic processing of these three values enables detection of a number of multiple turns up to 7,200 turns of the input shaft 5, which is the least common multiple of 32/3 turns, 27/3 turns, and 25/3 turns.

Figure 6:
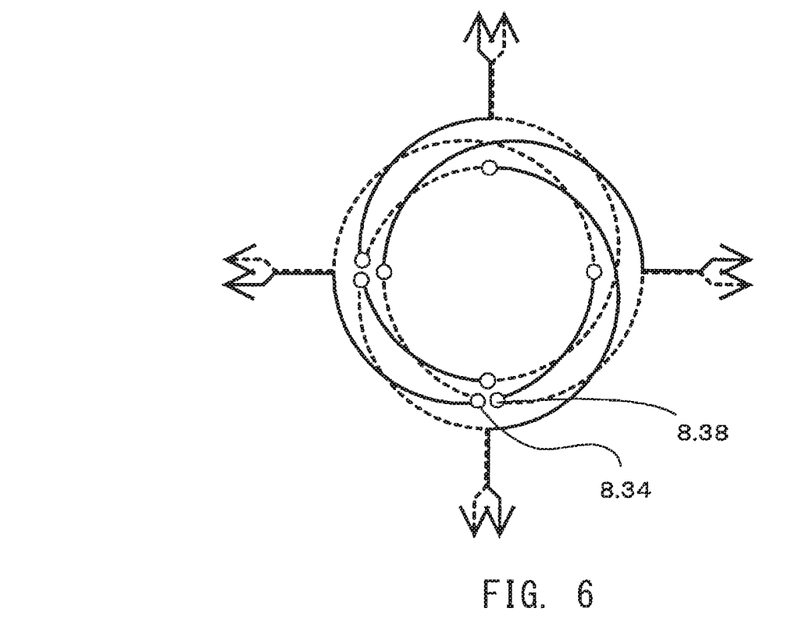
FIG. 6 is an enlarged view of an example according to an embodiment of the present invention, in which the shape of detection windings 8.3 and 9.3 illustrated in FIG. 3 is partially modified.

Referring to FIG. 5, two conductor traces of the detection winding 8.3 form an acute angle at the position 8.33. Production of such conductor traces forming an acute angle may be inaccurate. To avoid this, the positions of the two vias 8.34 and 8.38 may be shifted as illustrated in FIG. 6 to form a conductor pattern that goes back at an acute angle in different layers through a via. In this configuration, because the shape of the winding slightly deviates from the circumferences of two circles that have radii of the same length and have centers at two points that are 180 degrees apart from each other and evenly spaced from the axis of rotation of the resolver, the accuracy in detection of a rotation angle may decrease to some extent.

Although, in the embodiment illustrated in FIG. 1, a martensite stainless steel plate having a relatively small eddy current loss and a good magnetic permeability is used as a magnetic flux modulating component for a rotor core, the present invention may also be implemented by using a non-magnetic metal that disturbs an ac magnetic flux by an eddy current, such as aluminum or copper. In such configurations, the rotor cores may be shaped so as not to pass over the excitation windings.

Although, in the embodiment illustrated in FIG. 1, there is used the plate 6 of a soft magnetic material serving as both a housing of the multi-turn detector and a magnetic path for an excitation magnetic flux, this plate may be of a non-magnetic material such as a resin. Such configurations, however, may lower the level of an output signal from a detection winding.

In a configuration in which a housing of the multi-turn detector is of a non-magnetic material, a circular soft magnetic material core of a size enclosing a detection winding may be disposed, for each of the plurality of resolvers, under the excitation and detection windings. In this configuration, the level of an output signal from a detection winding increases, and the interference is more easily avoided than in the embodiment illustrated in FIG. 1, as the leakage of an excitation magnetic flux to the outside of the resolvers is reduced. As a result, because the distance between the resolvers is narrowed easily, the outer diameter size of the multi-turn detector can be further reduced. Also, weight reduction and lower inertia are achieved more easily than in the multi-turn detector illustrated in FIG. 1.

The invention claimed is:

1. A multi-turn detector for detecting an amount of multiple turns of an input shaft using a plurality of resolvers, each resolver comprising:

a rotor portion having a rotor core composed of a magnetic flux modulating component, the rotor portion rotating about a stationary shaft, which is separated from the input shaft in a plan view, in accordance with rotation of the input shaft at a reduction gear ratio that is different from that of a rotor portion of another resolver; and a stator portion having an excitation winding that excites an ac magnetic flux in a direction of an axis of rotation of the rotor portion and two detection windings that output ac signals that are obtained by performing amplitude modulation in accordance with a rotation angle of the rotor portion, wherein the excitation windings and the detection windings of the plurality of resolvers are formed by conductor traces in a common multi-layer printed circuit board, wherein the rotor portion of each resolver is formed from a soft magnetic material and the stationary shaft penetrates therethrough;

the excitation winding of each resolver has a circular shape enclosing the stationary shaft;

the detection windings of each resolver is provided outside the excitation winding to enclose the excitation winding; and the plurality of resolvers are arranged in a plane direction orthogonal to the input shaft.

2. A multi-turn detector for detecting an amount of multiple turns of an input shaft using a plurality of resolvers, each resolver comprising:
- a rotor portion having a rotor core composed of a magnetic flux modulating component, the rotor portion rotating about a stationary shaft, which is separated from the input shaft in a plan view, in accordance with rotation of the input shaft at a reduction gear ratio that is different from that of a rotor portion of another resolver; and
- a stator portion having an excitation winding that excites an ac magnetic flux in a direction of an axis of rotation of the rotor portion and two detection windings that output ac signals that are obtained by performing amplitude modulation in accordance with a rotation angle of the rotor portion, wherein the excitation windings and the detection windings of the plurality of resolvers are formed by conductor traces in a common multi-layer printed circuit board, wherein
- the excitation winding is a conductor trace that is wound about a center of rotation of the rotor portion, and
- the detection windings are conductor traces that extend on circumferences of two circles that have different centers and radii of the same length, each of the two circles enclosing a rotation center of the rotor portion, the conductor traces having a shape that is folded back in reverse directions at or near one of points of intersection of the two circles to extend in a first direction on a circumference of one of the two circles and to extend in a second direction opposite to the first direction on a circumference of the other circle.

3. The multi-turn detector according to claim 1, wherein the stator portion further has an annular conductor trace that is shaped in a circle that has its center at the center of rotation of the rotor portion, the annular conductor trace enclosing the two detection windings, and
the annular conductor trace is disposed in the common multi-layer printed circuit board.

4. The multi-turn detector according to claim 1, wherein the two detection windings include a first detection winding for outputting an ac signal that is obtained by performing amplitude modulation on a sinusoidal value of a rotation angle of a corresponding rotor portion and a second detection winding for outputting an ac signal that is obtained by performing amplitude modulation on a cosine value of a rotation angle of a corresponding rotor portion, and
a detection winding of each of the plurality of resolvers is serially connected to a detection winding of another resolver through wiring composed of one or more conductor traces in the multi-layer printed circuit board.

5. The multi-turn detector according to claim 4, wherein the wiring includes two conductor traces that are of identical shape and are disposed at the same position as each other in two different layers, the two conductor traces being connected to an associated detection winding at a portion of the associated detection winding within a range of plus or minus 30 degrees from a position of the associated detection winding that is farthest from the center of rotation of the rotor portion.

6. The multi-turn detector according to claim 1, wherein ends of the excitation windings of the plurality of resolvers are connected to a common conductor solid pattern provided in the multi-layer printed circuit board.

7. The multi-turn detector according to claim 1, wherein the rotor portion includes a resin gear and the magnetic flux modulating component that is bonded to the resin gear.

8. The multi-turn detector according to claim 1, wherein the magnetic flux modulating component of the rotor portion is a steel plate.

9. The multi-turn detector according to claim 1, wherein the magnetic flux modulating component of the rotor portion is composed of a non-magnetic metal.

10. The multi-turn detector according to claim 1, wherein a soft magnetic material plate is disposed on a side opposite to the rotor portions with the multi-layer printed circuit board interposed between the soft magnetic material plate and the rotor portions.

11. The multi-turn detector according to claim 10, wherein the soft magnetic material plate is a steel plate and is bonded, by sheet metal working, to stationary shafts that support the rotation of the rotor portions.

12. The multi-turn detector according to claim 10, wherein the soft magnetic material plate is of a size covering all of the detection windings.

* * * * *